(12) United States Patent
Shukla et al.

(10) Patent No.: US 9,060,418 B2
(45) Date of Patent: Jun. 16, 2015

(54) SYSTEMS AND METHODS FOR IMPROVED WINDOW MOUNTING ON AN ELECTRONIC DEVICE

(75) Inventors: Ashutosh Y. Shukla, Santa Clara, CA (US); Thomas R. Louchard, Pacifica, CA (US); Vincent Yan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 375 days.

(21) Appl. No.: 13/607,530

(22) Filed: Sep. 7, 2012

(65) Prior Publication Data

US 2014/0071596 A1 Mar. 13, 2014

(51) Int. Cl.
*H05K 5/00* (2006.01)
*G06F 1/16* (2006.01)

(52) U.S. Cl.
CPC ............ *H05K 5/0017* (2013.01); *G06F 1/1656* (2013.01)

(58) Field of Classification Search
CPC .... B32B 37/00; B32B 37/0076; B32B 37/06; B32B 37/12; B32B 37/1207; B32B 37/16; B32B 2037/1223; B32B 2037/1253
See application file for complete search history.

(56) References Cited

U.S. PATENT DOCUMENTS

| | | | |
|---|---|---|---|
| 6,190,488 B1 * | 2/2001 | Tada et al. | 156/228 |
| 2009/0008142 A1 | 1/2009 | Shimizu et al. | |
| 2009/0162645 A1 * | 6/2009 | Matsuhira | 428/332 |
| 2009/0322705 A1 * | 12/2009 | Halsey, IV | 345/174 |
| 2011/0070448 A1 | 3/2011 | Matsumura et al. | |

FOREIGN PATENT DOCUMENTS

| | | |
|---|---|---|
| GB | 913547 | 12/1962 |
| GB | 1208737 | 10/1970 |
| JP | 2004072010 | 3/2004 |

* cited by examiner

*Primary Examiner* — Richard Crispino
*Assistant Examiner* — Matthew Hoover
(74) *Attorney, Agent, or Firm* — Joseph F. Guihan

(57) ABSTRACT

Systems and methods for improved window mounting on electronic devices are provided. A window mounting assembly can include a heat activated adhesive, such as a heat activated film ("HAF"), which can be used to secure a window to an enclosure. In some embodiments, heated air can be blown in from a bottom side of the window, which can provide better offset control in the assembly. In some embodiments, an undercut can be made in the enclosure that can act as a trap for HAF overflow. An overhang that is created by the undercut can reduce the visibility of HAF overflow from a user. In addition, the heated air that is applied to the window can create a high pressure region in an area underneath the window. The high pressure region can direct the HAF overflow away from this area and towards the undercut in the enclosure.

20 Claims, 5 Drawing Sheets

SYSTEMS AND METHODS FOR IMPROVED WINDOW MOUNTING ON AN ELECTRONIC DEVICE

FIELD OF THE INVENTION

This can relate to systems and methods for improved window mounting on an electronic device.

BACKGROUND OF THE DISCLOSURE

Many electronic devices (e.g., media players and cellular telephones) often include one or more transparent windows as protective covers for functional components. For example, an electronic device can have a camera lens and/or a display that needs to be protected by transparent windows. An adhesive, typically a liquid adhesive or a pressure sensitive adhesive ("PSA"), may be used to mount a window to the electronic device.

These conventional adhesives, however, can present multiple challenges during the mounting process. In particular, the thicknesses of PSAs are not precisely controllable. Liquid adhesives require both a significant time to cure and large amounts of assembly equipment and space during mass production. Furthermore, both PSAs and liquid adhesives have overflow issues during mounting.

SUMMARY OF THE DISCLOSURE

Systems and methods are disclosed for improved window mounting on electronic devices. A window mounting assembly can include a heat activated adhesive, such as a heat activated film ("HAF"), which can be used to secure a window to an enclosure of an electronic device.

In some embodiments, heated air can be blown in from a bottom side of the window. This can provide better offset control in the assembly, which can allow the window to be set to a precise height relative to the enclosure. As used herein, an "offset" can refer to the normal distance between a window and the surrounding enclosure. As a result of the application of heated air, a zero offset between the window and the surrounding enclosure can be achieved. This can improve both the cosmetics and overall reliability of the assembly.

In some embodiments, an undercut can be made in an enclosure that can act as a trap for HAF overflow. An overhang that is created by the undercut can reduce the visibility of the HAF overflow from a user.

In addition, the heated air that is applied to the bottom side of the window can create a high pressure region in an area underneath the window. This area can be open to one or more functional components, which may need to be protected from HAF overflow. The high pressure region can direct the HAF overflow away from this area and towards the undercut in the enclosure.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which.

DETAILED DESCRIPTION OF THE DISCLOSURE

Systems and methods for window mounting assemblies on electronic devices are provided and described with reference to FIGS. 1-5.

Figure 1:
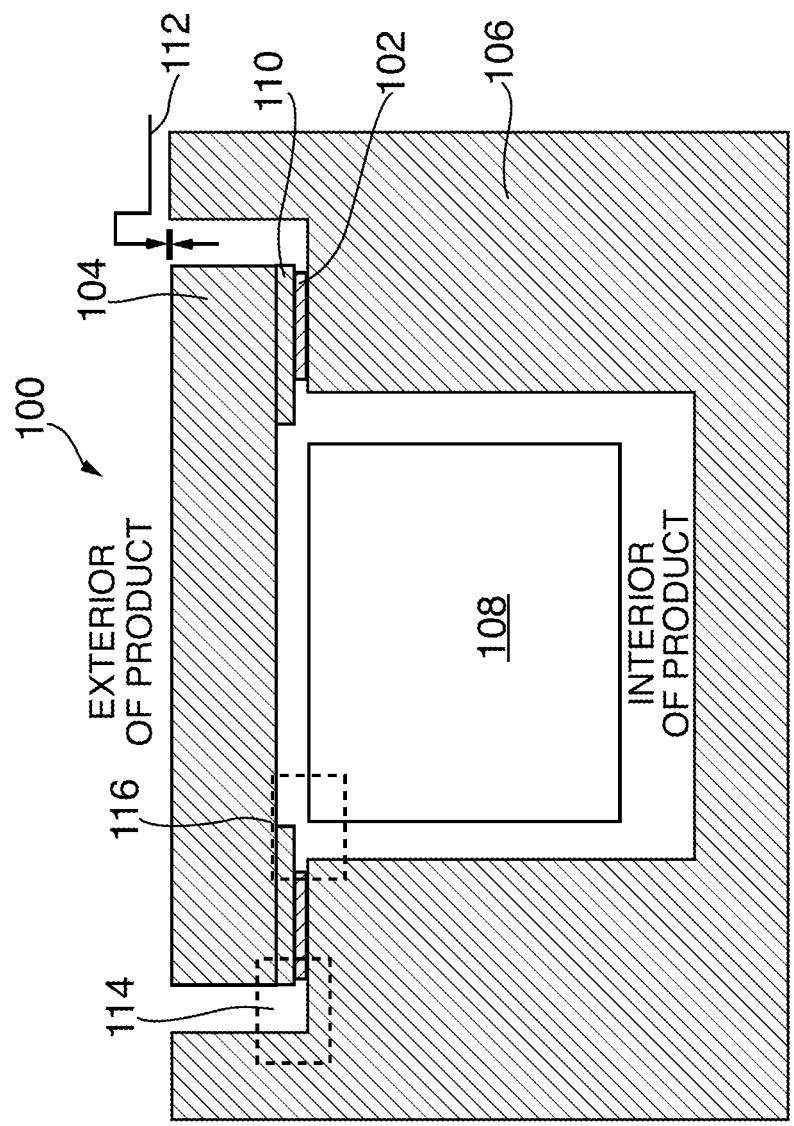
FIG. 1 is a cross-sectional view of a conventional window mounting of an electronic device assembly.

FIG. 1 is a cross-sectional view of a conventional window mounting assembly 100 of an electronic device. The electronic device can be any suitable electronic device having one or more windows. The term "electronic device" can include, but is not limited to, music players, video players, still image players, game players, other media players, music recorders, video recorders, cameras, other media recorders, radios, medical equipment, domestic appliances, transportation vehicle instruments, musical instruments, calculators, cellular telephones, other wireless communication devices, personal digital assistants, remote controls, pagers, computers (e.g., desktops, laptops, tablets, servers, etc.), monitors, televisions, stereo equipment, set up boxes, set-top boxes, boom boxes, modems, routers, keyboards, mice, speakers, printers, and combinations thereof. In some embodiments, the electronic device may perform a single function (e.g., a device dedicated to playing music) and, in other embodiments, the electronic device may perform multiple functions (e.g., a device that plays music, displays video, stores pictures, and receives and transmits telephone calls).

The one or more windows can serve as protective covers for one or more functional components such as, for example, displays or cameras. Persons skilled in the art will appreciate that the windows can be used as protective covers for any suitable functional component of an electronic device (e.g., any component that requires an optical view to the exterior of the electronic device). Thus, the windows can be any suitable size and can be made of any suitable material (e.g., a transparent material such as polished glass, plastic, and/or polished ceramic). In some cases, for example, the window can be a lens. In some embodiments, the windows can have a cosmetic mask (e.g., ink) on one or more portions.

Various characteristics of the window can pose challenges for the mounting process. For example, the window can be made of glass that do not have any features that are suitable for mounting. As a result, the window can only be mounted on a device using an adhesive. In addition, because the window made be made of glass and/or ceramic, the window may be sensitive to impact. In addition, if the window is transparent, any overflow from an adhesive may be easily visible.

In order to ensure that a window is mounted properly on the device, the offset and the bond strength of the window mounting assembly can be particularly important. As used herein, the "offset" can refer to the normal distance between a window and the surrounding enclosure. Furthermore, as used herein, the "bond strength" can refer to the minimum force required to push or pull the window off the enclosure.

In particular, a zero or negative offset (e.g., where the window is lower than the surrounding enclosure) can provide a more robust design. That is, if the window is made of a fragile material, a flush or sub-flush design can reduce the likelihood that the window will be the initial strike surface in a drop. Rather, another portion of the housing of the electronic device, which may be made from a more robust material such as metal or plastic, can take the initial impact.

In addition, in terms of cosmetics, zero offsets can provide a more uniform and precise surface. Moreover, zero offsets may allow the electronic device to have fewer steps and gaps. These steps and gaps are undesirable because they may catch on fabrics, edges, etc., and can collect dust, dirt, or grime. Thus, being able to control the height of an adhesive (e.g., ensuring evenness of the adhesive during application) is important for producing a zero offset in a window mount.

In addition, a maximized bond strength can improve the reliability of the electronic device during drop testing and rough handling. Thus, adhesive strength is also important when considering various mounting alternatives.

For example, as shown in FIG. 1, adhesive 102 can be used to mount window 104 to enclosure 106 of the electronic device. Adhesive 102 can be a pressure sensitive adhesive ("PSA") or a liquid adhesive (e.g., liquid glue). Enclosure 106 (e.g., housing) can be a cosmetic trim, and can be made of any suitable material such as, for example, plastic (e.g., molded plastic) and/or metal. Window 104 can serve as a protective cover for functional component 108, which can be a display and/or a camera. In some cases, window 104 can have cosmetic mask 110, which can be printed or silk screened ink. Offset 112 can vary depending on the thickness of window 104, the thickness of adhesive 102, and/or the size tolerances of enclosure 106.

Die-cut PSAs can have a soft or spongy texture, and thus may spring back once assembled. As a result, window 104 may move relative to other components over time. In addition, the thicknesses of PSAs are not precisely controllable. Hence, offset 112 between window 104 and enclosure 106 may vary for different assemblies. Offset 112 may also vary based on temperature fluctuations. Furthermore, PSAs contain a tacky surface, which can collect foreign materials if the PSA is misaligned. PSAs also have relatively weak bonding strengths as compared to other adhesives.

Liquid adhesives, on the other hand, can be used along with assembly fixtures to set precise offsets. However, these adhesives require significant time to cure and large amounts of assembly equipment and space during mass production.

For both PSAs and liquid adhesives, there can be overflow (e.g., squeeze out). For example, liquid adhesive dispensation volumes can vary during manufacturing, which can lead to undesirable overflow in cosmetic area 114 and functional area 116 for a certain percentage of assemblies. This can either result in production loss or necessitate re-work.

Thus, in some cases, heat activated film ("HAF") adhesives can be used instead of PSAs or liquid adhesives. HAF is a thermoset, which can be a heat-activated resin (e.g., phenolic resin) in its initial form. Following a curing (e.g., activation) process, during which heat and pressure are jointly applied to the heat-activated resin, the HAF can be set to its final adhesive form (e.g., a solid material such as plastic). After the HAF has been cured, the HAF can be die-cut.

HAFs can offer higher bonding strengths (e.g., five to ten times higher) than PSAs. In addition, unlike PSAs, HAFs can cure to a solid state. Thus, HAFs can allow some control over final offset. Moreover, unlike liquid adhesives, HAFs do not need complex dispensation equipment during the mounting process because HAFs are solid.

Figure 2:
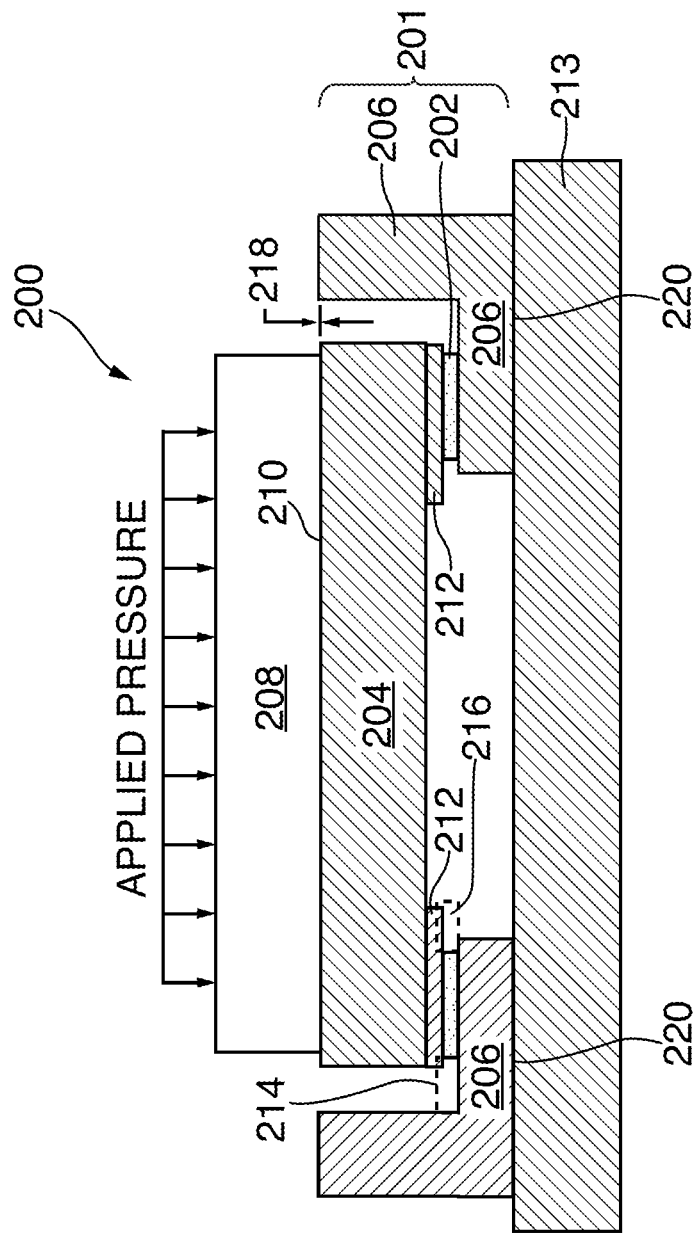
FIG. 2 is a cross-sectional view of a system with another window mounting assembly.

For example, referring now to FIG. 2, a cross-sectional view of system 200 is shown with window mounting assembly 201. In particular, HAF 202 can be used to mount window 204 to enclosure 206. Window 204 and enclosure 206 can be the same as or similar to window 104 (FIG. 1) and enclosure 106 (FIG. 1), respectively. In some cases, enclosure 206 can be placed on assembly fixture datum 213.

During assembly, heated block 208 (e.g., a heated head) can be applied to side 210 of window 204. Heated block 208 can be pressed down for both a pre-determined period of time and a pre-determined distance. Heat from heated block 208 can conduct through window 204, which can then heat up mask 212 and HAF 202.

Unfortunately, heat conduction losses through the various components (e.g., window 204 and mask 212) may cause variations in the temperature of heat that actually reaches HAF 202 (e.g., varying degrees of temperature drops). As a result, experiments are needed in order to estimate the actual temperature of heat that reaches HAF 202. This unpredictability can complicate the manufacturing process.

In addition, during the curing process, HAF 202 can ooze and flow in a manner that is similar to a liquid adhesive. Thus, HAF 202 can create similar cosmetic and functional challenges such as, for example, overflow in cosmetic area 214 and functional area 216.

Furthermore, the reliability of assembly 201 can vary based on the various tolerances of components that are stacked up against heated block 208. For example, if window 204 and HAF 202 are relatively thick in comparison to enclosure 206, there may be a large amount of HAF squeeze out. In contrast, if window 204 and HAF 202 are relatively thin in comparison to enclosure 206, there may not be enough of HAF squeeze out, which can lead to a weak mount.

As another example, if enclosure 206 is plastic or has a heat tolerance that is below the temperature of heat applied during the HAF curing process, enclosure 206 cannot be used as a touch-off surface for heated block 208. As yet another example, offset 218 can vary as a result of press head location during assembly. In some cases, in order to create a controlled offset, the press head can be designed to bottom against enclosure 206 (e.g., press against side 220 of enclosure 206). This, however, may cause heat damage to the enclosure material. Moreover, there can still be variability in offset 218 depending on the tolerances of components of assembly 201.

Accordingly, in order to obtain greater precision in window mounting applications that use HAFs, several improvements can be made over existing assemblies. In particular, instead of using a heated block to press into a window from a top side, heated air can be blown in from a bottom side of the window. This can provide better offset control in the assembly, which can allow the window to be set to a precise height relative to an enclosure. In addition, an undercut can be created in the enclosure that can act as a trap for HAF overflow.

Figure 3C:
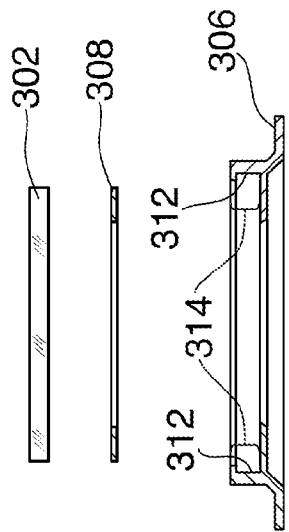
FIGS. 3A-3C are perspective views of a window mounting assembly of an electronic device in accordance with some embodiments of the invention.
Figure 3B:
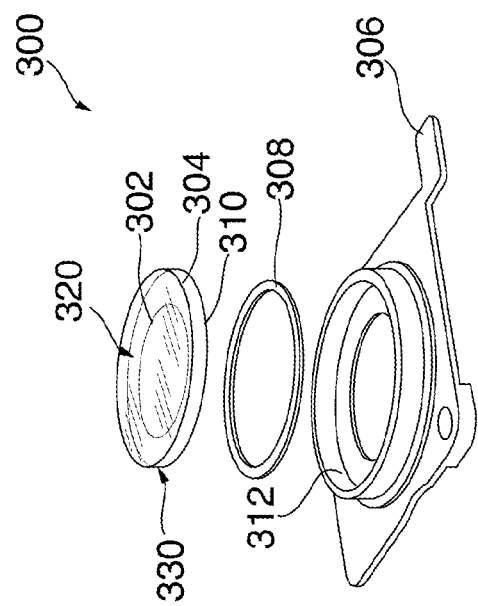
Figure 3A:
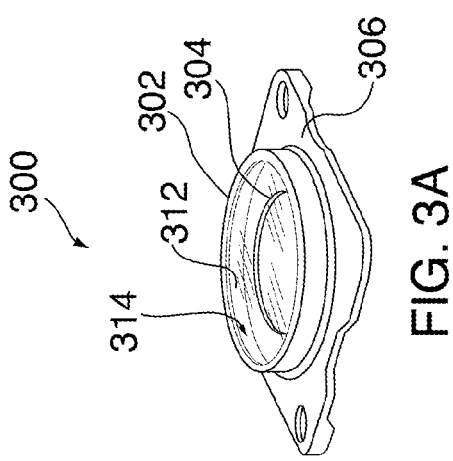

Referring now to FIGS. 3A-3C, perspective views of a window mounting assembly 300 of an electronic device are shown. FIG. 3A shows a perspective view of assembly 300. Assembly 300 can include window 302, cosmetic mask 304, and enclosure 306.

Enclosure 306 can include undercut 312, which can be formed on enclosure 306 using any suitable technique(s). For example, if enclosure 306 is metal, undercut 312 can be cut into inner surface 314.

FIG. 3B shows an exploded perspective view of assembly 300, which can include HAF 308 between window 302 and enclosure 306. Window 302 can include bottom side 310, top side 320, and surrounding side 330. In some embodiments, window 302 can include cosmetic mask 304 on side 310. In some cases, cosmetic mask 304 can be printed or silk screened on side 310.

FIG. 3C shows an exploded cross-sectional view of assembly 300.

Figure 4:
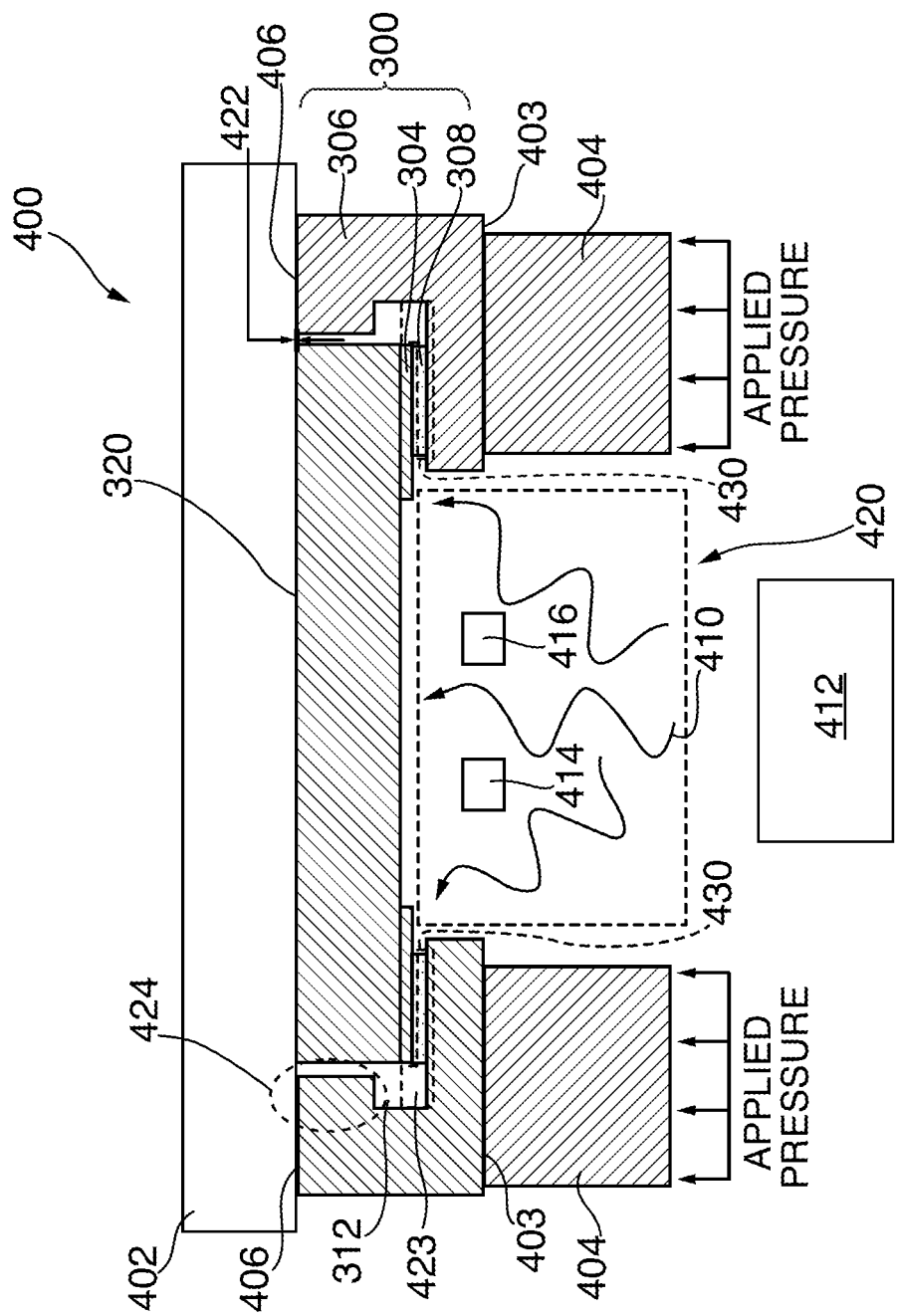
FIG. 4 is a cross-sectional view of a system for creating the window mounting assembly of FIGS. 3A-3C in accordance with some embodiments of the invention.

Turning now to FIG. 4, a cross-sectional view of system 400 is shown for creating window mounting assembly 300 of FIGS. 3A-3C. In addition to assembly 300, system 400 can include assembly fixture datum 402 and additional fixture 404. Because assembly 300 has a circular shape, fixture 404 can be a ring that is pressing up against side 403 of enclosure 306. However, persons skilled in the art will appreciate that fixture 404 can have any suitable shape.

Enclosure 306 can include undercut 312 between sides 403 and 406. Side 403 can be located in the interior of an electronic device, and side 406 can be located in the exterior of an electronic device. Side 406 of enclosure 306 and side 320 of window 302 can be arranged underneath fixture datum 402. In addition, window 302 can be coupled to HAF 308 on side 310.

HAF 308 can be cured by directly applying forced heated air 410. For example, as shown in FIG. 4, heated air 410 can be supplied to both side 310 of window 302 and HAF 308 by air heater 412. Once HAF 308 reaches a final solid state via the curing process, window 302 can be secured to enclosure 306.

In some cases, system 400 can include one or more temperature sensors (e.g., temperature sensors 414 and 416) configured to monitor the temperature of heated air 410. The one or more temperature sensors can be thermocouples, which can be arranged below side 310 of window 302. As shown, temperature sensors 414 and 416 can be standalone components. Persons skilled in the art will appreciate that the temperature sensors can be located in any suitable location in system 400 (e.g., attached to air heater 412).

In some embodiments, air heater 412 can adjust the temperature of heated air 410 based on one or more outputs of the temperature sensors. For example, air heater 412 can increase or decrease the temperature of heated air 410 until it reaches an optimal temperature for curing HAF 308.

Because heated air 410 only needs to travel in a small functional area 420, there may be very little temperature drop between when heated air 410 leaves air heater 412 and when it reaches HAF 308. In addition, because heated air 410 is supplied directly to HAF 308, the temperature of heated air 410 can be controlled more precisely than the temperature of heat applied to HAF 202 in system 200 (FIG. 2). This can lead to better process control during assembly.

While heated air 410 is supplied to HAF 308, fixture 404 can be used to bias (e.g., press) side 320 of window 302 and side 406 of enclosure 306 directly against fixture datum 402. In particular, fixture 404, which can be non-heated, can apply pressure to assembly 300 until side 320 of window 302 and side 406 of enclosure 306 are both touching the bottom surface of fixture datum 402. In some cases, fixture 404 can be spring loaded.

Because assembly 300 can be biased directly against a flat, unmoving surface of fixture datum 402, offset 422 can be more precisely controlled than offset 218 of system 200 (FIG. 2). In particular, offset 422 can be controlled by a single flat surface (e.g., the flat bottom surface of fixture datum 402) rather than being dependent on the motion tolerances of heated block 208.

Because offset 422 can be manufactured to be zero (e.g., side 406 of enclosure 306 can be co-planar with side 320 of window 302), there can be better reliability during drop tests. In addition, a zero offset can eliminate any gaps and steps that can catch on various objects. Cosmetics can also be improved because the outer surface of assembly 300 can appear as one clean uniform surface rather than several components that are pieced together.

While assembly 300 is being pressed against fixture datum 402 during the curing process, HAF 308 will need to flow and ooze out. Undercut 312 of enclosure 306 can form a trap for the HAF overflow in cosmetic area 423. In addition, because overhang 424 is created in enclosure 306 by undercut 312, overhang 424 can obscure the overflow from a user's line of sight. This reduced visibility of overflow can improve the overall cosmetics of assembly 300.

The application of forced heated air 410 to side 310 of window 302 can also create a high pressure region in functional area 420 (e.g., an area directly underneath side 310 of window 302). Functional area 420 can be open to one or more functional components (e.g., camera and/or display) that are underneath window 302. In some cases, the functional component(s) can be the same as or similar to functional component 108 of FIG. 1.

While HAF 308 cures to a solid state, the pressure of the high pressure region can direct the HAF overflow to cosmetic area 423 (e.g., flow into undercut 312) and away from functional area 420. Thus, HAF overflow can be found only in a region (e.g., region 430) below cosmetic mask 304 of window 302 and in undercut 312, and not in functional area 420. As a result, functional components can be protected from HAF overflow.

Figure 5:
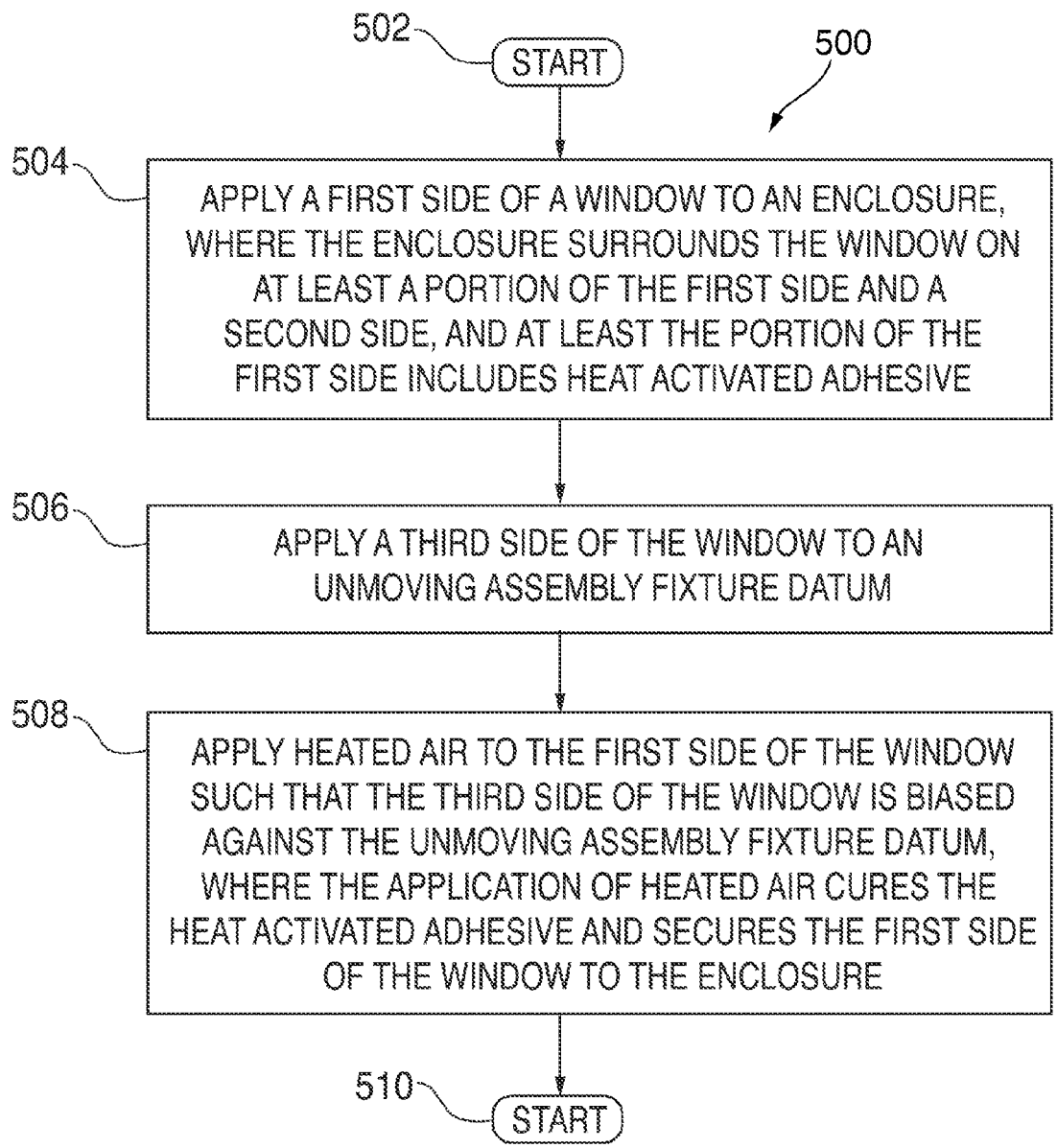
FIG. 5 is a flowchart of an illustrative process for creating a window mounting assembly in accordance with some embodiments of the invention.

FIG. 5 is a flowchart of an illustrative process 500 for creating a window mounting assembly (e.g., window mounting assembly 300 of FIGS. 3A-3C and FIG. 4) in accordance with some embodiments of the invention. Process 500 may start at step 502, and, at step 504, a first side (e.g., side 310 of FIG. 4) of a window (e.g., window 302 of FIG. 4) can be applied to an enclosure (e.g., enclosure 306 of FIG. 4), where the enclosure surrounds the window on at least a portion of the first side and a second side (e.g., side 330 of FIG. 3B), and at least the portion of the first side includes heat activated adhesive (e.g., heat activated adhesive 308 of FIG. 4). In some cases, the heated activated adhesive can be a HAF.

At step 506, a third side (e.g., side 320 of FIG. 4) of the window can be applied to an unmoving assembly fixture datum (e.g., assembly fixture datum 402 of FIG. 4). Continuing to step 508, heated air (e.g., heated air 410 of FIG. 4) can be applied to the first side of the window such that the third side of the window is biased against the unmoving assembly fixture datum, where the application of heated air cures the heat activated adhesive and secures the first side of the window to the enclosure.

In addition, a side (e.g., side 406 of FIG. 4) of the enclosure can also be pressed against the unmoving assembly fixture datum. The biasing of the enclosure and the window can occur until both the third side of the window and the side of the enclosure are touching the assembly fixture datum. In some cases, a fixture (e.g., fixture 404 of FIG. 4) can be used to press the side of the enclosure against the assembly fixture datum. Process 500 may then end at step 510.

While there have been described assemblies for improved window mounting on an electronic device, it is to be understood that many changes may be made therein without departing from the spirit and scope of the invention. It is also to be understood that various directional and orientational terms such as "up" and "down," "front" and "back," "top" and "bottom" and "side," "below" and "underneath," and the like are used herein only for convenience, and that no fixed or absolute directional or orientational limitations are intended by the use of these words. For example, the devices of this invention can have any desired orientation. If reoriented, different directional or orientational terms may need to be used in their description, but that will not alter their fundamental nature as within the scope and spirit of this invention.

It is further to be understood that process 500 of FIG. 5 is merely illustrative. Any of the steps may be removed, modified, or combined, and any additional steps may be added, without departing from the scope of the invention.

The described embodiments of the invention are presented for the purpose of illustration and not of limitation.

What is claimed is:

1. A method for using a heat activated adhesive for mounting a window on an electronic device, the window comprising first, second, and third sides, the method comprising:
   applying the first side of the window to an enclosure, wherein the enclosure surrounds the window on at least a portion of the first side and the second side, and at least the portion of the first side comprises the heat activated adhesive;
   applying the third side of the window to an unmoving assembly fixture datum; and
   applying heated air to the first side of the window such that the third side of the window is biased against the unmoving assembly fixture datum, wherein the application of the heated air cures the heat activated adhesive and secures the first side of the window to the enclosure.

2. The method of claim 1, wherein the heat activated adhesive is a heat activated film ("HAF").

3. The method of claim 1, further comprising pressing a side of the enclosure against the unmoving assembly fixture datum.

4. The method of claim 3, wherein the side of the enclosure is pressed against the unmoving assembly datum surface until both the third side of the window and the side of the enclosure are touching the unmoving assembly fixture datum.

5. The method of claim 3, wherein pressing the side of the enclosure comprises using a fixture to press the side of the enclosure against the unmoving assembly fixture datum.

6. The method of claim 5, wherein the fixture is a ring.

7. The method of claim 5, wherein the fixture is spring-loaded.

8. The method of claim 1, wherein the heated air creates a high pressure region underneath the window.

9. The method of claim 8, wherein pressure of the high pressure region directs overflow of the heated activated adhesive away from the high pressure region.

10. The method of claim 1, wherein the heat activated adhesive is a thermoset.

11. The method of claim 1, wherein the heat activated adhesive cures into a solid material.

12. The method of claim 1, wherein the heat activated adhesive cures into plastic.

13. A method for using a heat activated adhesive for mounting a window on an electronic device, the window comprising first and second opposing sides connected by a third and fourth opposing sides, the method comprising:
   placing the first side of the window on an enclosure, wherein the enclosure partially surrounds the window, and wherein the heat activated adhesive is formed on the first side of the window;
   placing an unmoving assembly fixture on the second side of the window; and
   applying heated air to the first side of the window to bias the second side of the window against the unmoving assembly fixture, wherein the application of the heated air cures the heat activated adhesive and secures the first side of the window to the enclosure.

14. The method of claim 13, wherein the enclosure surrounds only a portion of the first side of the window, the entire third side of the window, and the entire fourth side of the window.

15. The method of claim 13, wherein the first side of the window has a periphery, and wherein the heat activated adhesive is formed on the periphery of the first side of the window.

16. The method of claim 13, wherein placing the unmoving assembly fixture on the second side of the window comprises the entire second side of the window being placed in direct contact with the unmoving assembly fixture.

17. The method of claim 13, further comprising monitoring the temperature of the heated air with one or more temperature sensors.

18. The method of claim 1, wherein the second side of the window has first portion that is directly adjacent to a side of the enclosure.

19. The method of claim 18, wherein the second side of the window has a second portion that is not directly adjacent to the side of the enclosure.

20. The method of claim 19, wherein overflow of the heat activated adhesive flows into a recess formed in between the second portion of the second side of the window and the side of the enclosure.

* * * * *